United States Patent [19]
Davis

[11] 4,039,625
[45] Aug. 2, 1977

[54] BENEFICIATION OF OLIVINE FOUNDRY SAND BY DIFFERENTIAL ATTRITION GRINDING

[75] Inventor: Edward G. Davis, Tuscaloosa, Ala.

[73] Assignee: The United States of America as represented by the Secretary of the Interior, Washington, D.C.

[21] Appl. No.: 749,583

[22] Filed: Dec. 10, 1976

[51] Int. Cl.² .............................................. C01B 33/22
[52] U.S. Cl. ..................................... 423/326; 241/14; 241/21; 241/24
[58] Field of Search ....................... 241/14, 16, 21, 24, 241/26, 29, DIG. 10; 252/457; 423/326

[56] References Cited

U.S. PATENT DOCUMENTS

| | | |
|---|---|---|
| 1,898,371 | 2/1933 | Hutchins ...................... 241/DIG. 10 |
| 2,232,696 | 2/1941 | Earle ........................................ 241/14 |
| 3,075,710 | 1/1963 | Feld et al. ............................... 241/16 |

*Primary Examiner*—Granville Y. Custer, Jr.
*Attorney, Agent, or Firm*—William S. Brown; Donald A. Gardiner

[57] ABSTRACT

A high quality olivine foundry sand is produced from olivine-containing rock by wet differential attrition grinding followed by a size separation to remove finely-divided gangue materials. The olivine sand product displays rounded grains, has a low impurity content and produces castings having superior surface quality.

10 Claims, No Drawings

BENEFICIATION OF OLIVINE FOUNDRY SAND BY DIFFERENTIAL ATTRITION GRINDING

BACKGROUND OF THE INVENTION

Olivine is a naturally-occurring mineral having the nominal formula $(Mg,Fe)_2SiO_4$. It is commonly olive-green in color, has a Mohs hardness of 6.5 to 7, a specific gravity of about 3.2–3.3 and is difficultly fusible.

Olivine, also known as chrysolite, is gaining favor as a foundry sand in preference to silicas such as quartz because of the advantages it offers over silica. Olivine avoids the silicosis hazard of ordinary foundry sands and allows higher casting temperatures. While not as refractory as chromite or zircon, olivine does allow casting at temperatures some 300° to 400° F higher than is possible using silica sands.

Sources of olivine include the igneous rocks such as peridotite, norite, basalt, diabase and gabbro and as the product of metamorphism of certain sedimentary rocks containing magnesia and silica such as impure dolomites. Olivine may be present as an accessory component or may make up the main rock constituent as in the dunite variety of peridotite. Olivine foundry sand is presently produced at two locations in this country. One is in the State of Washington and the other is in the western part of North Carolina.

In addition to size standards, the Steel Founders' Society of America (SFSA) specifications for olivine sand require that the loss on ignition (LOI) must be 1.35% or less. Washington state olivine deposits are so pure that the mined olivine need merely be crushed and sized to meet the SFSA specifications. North Carolina dunite, however, must be beneficiated in addition to crushing and sizing to meet the SFSA LOI specifications. The LOI is derived mostly from the water of hydration of talc, serpentine and similar minerals occurring as accessory minerals in the dunite.

The beneficiation technique commonly used to upgrade North Carolina dunites is gravity tabling. But even with beneficiation, the dunite is selectively mined to insure that the amount of gangue material is not too high. Olivine containing about 3.5% LOI, for example, is now considered too impure to be commercially beneficiated.

DISCUSSION OF THE PRIOR ART

Prior art methods used in upgrading olivine sands rely upon differences in specific gravity between the desired olivine and the gangue materials to effect a separation. These methods, such as gravity tabling, are not very satisfactory because of the relatively small differences in specific gravity between the minerals contained in the olivine deposits. For example, talc which is often present as an impurity has a specific gravity of about 2.7–2.8, serpentine has a specific gravity of 2.5–2.6 while olivine has a specific gravity of 3.2–3.3. Consequently, prior art gravity separation methods require a choice between low recovery of quality olivine or a strict limitation of the gangue content of the as-mined olivine sand.

It is also known to regenerate or recondition used foundry sand by a variety of scouring or abraiding techniques to remove the organic binder from sand grains. Jacob in U.S. Pat. No. 3,857,201 admixes used casting sand with fresh sand and subjects the mixture to mechanical agitation in an air stream. The contaminant coating on the used sand is at least partially scoured off by the fresh casting sand. Carpenter et al disclose in U.S. Pat. No. 3,848,815 a horizontally-disposed rotating drum in combination with an abrasive blast means. Rotation of the drum causes used foundry sand, or other material being treated, to move forward toward a stream of abrasive particles projected into the drum. As a result, sand grains are cleaned and separated from each other. In U.S. Pat. No. 3,863,847, Day et al disclose a vibration technique to remove organic matter coated on sand grains. These three patents all utilize dry methods to accomplish what might be considered a selective or differential grinding of one component in a particulate mixture.

Differential attrition grinding of particulate materials in a water slurry is also known and practiced. One such attrition grinder, developed for the wet grinding of kaolin clays to extreme fineness, is disclosed in the Feld et al patent, U.S. Pat. No. 3,075,710. Grinding is accomplished in a vessel having a cage-like rotor which is turned at a relatively high speed. The grinding charge comprises a slurry of water, clay and sand which acts as the grinding medium. This same device has been used to autogenously grind ceramic powders using larger particles of the same ceramic as the grinding media.

SUMMARY OF THE INVENTION

Olivine sand, suitable for foundry use, is produced from olivine-containing rock such as relatively low-grade dunites. The rock is crushed and is subjected to a wet, differential attrition grinding of sufficient intensity to finely comminute gangue materials contained in the rock. Olivine sand grains are rounded by the grinding but do not undergo any substantial size reduction. Thereafter, the finely ground gangue materials are separated from the larger olivine sand grains by sizing techniques such as screening or hydraulic classification.

Thus, it is an object of this invention to beneficiate olivine sand.

It is another object of this invention to recover olivine from low-grade source materials.

Another object of this invention is to enhance the properties of olivine foundry sands.

A specific object of this invention is to produce olivine foundry sands displaying a low LOI and a rounded configuration of individual sand grains.

DISCUSSION OF THE INVENTION

An olivine-rich rock, such as dunite, may be subjected to a wet differential attrition grinding which selectively comminutes the impurity or gangue minerals occurring with olivine. Thereafter, the olivine can be recovered as a substantially purified or concentrated product fraction by sizing techniques such as hydraulic classification. Thus, a high quality olivine foundry sand can be produced from a low-grade olivine containing rock at low cost with high overall olivine recovery.

The physical properties of olivine and of its associated gangue minerals makes this beneficiation technique possible. Talc and serpentine are often associated with olivine, as in dunite, and these minerals are particularly undesirable because of their contained water of hydration. However, both talc and serpentine are relatively soft; talc having a (Mohs) hardness of 1 to 1.5 while the hardness of serpentine is generally in the range of about 2.5 to 4. These minerals are readily ground by olivine which has a hardness in the 6.5 to 7 range.

Other impurity minerals including hornblende and pyroxene have a hardness much closer to that of olivine but are nevertheless readily comminuted by olivine. The greater brittleness or friability of horneblende, pyroxene and similar minerals results in their ready comminution under conditions of differential attrition grinding. Thus, the relative grindability of gangue minerals is a function both of their lesser hardness and greater brittleness as compared to olivine.

As well as being relatively hard, olivine is a tough, hard-to-fracture mineral. Olivine sand grains in a rock such as dunite typically show sharp edges. The attrition grinding tends to round off the sharp edges resulting in more nearly spherical sand grains. Rounding of the olivine sand grains makes the product much more desirable for foundry use. Rounded grains are preferred because less binder is required for the same mold strength as compared to sharp-edged grains.

Differential attrition grinding is accomplished by intense agitation in a water slurry. Any high energy-high shear attrition scrubber or grinder, such as those used commercially to grind clays, may be employed to practice this invention. The apparatus disclosed in the Feld et al patent, U.S. Pat. No. 3,075,710, is particularly well-suited for use in this process. On the other hand, a scrubber with a more gentle action, such as the Denver Scrubber manufactured by Joy Manufacturing Company, will not accomplish the desired grinding of gangue materials or rounding of the olivine grains.

Grinding is carried out autogenously; that is, no grinding medium other than the olivine rock itself is used. Traditional grinding methods and apparatus including rod mills, ball mills and the like are completely unsatisfactory for use in this process because these devices comminute the olivine sand as well as gangue minerals.

The time required to accomplish the required degree of differential grinding depends upon a number of variables. First, of course, is the intensity of the grinding action employed. Other factors influencing grinding time include the type, hardness and concentration of gangue materials and the desired purity of the olivine sand product. When using the Feld et al device, grinding times required are generally in the range of about 5 minutes to 1 hour.

A typical approach to beneficiating olivine-rich rocks includes a first crushing step using conventional roll crushers or the like to provide a lump-free feed to the attrition grinder. Crushing to about minus 20 mesh provides an appropriate feed stream. The crushed rock is then slurried in water and is subjected to differential attrition grinding for a time sufficient to comminute the gangue minerals to a size of about minus 200 mesh or finer. The grinding step also results in substantial rounding of the individual olivine sand grains. Solids content of the grinding slurry is not critical but best economy is obtained in the Feld et al grinder at solids concentrations in the range of about 30 to 50%. Grinding may be accomplished on either a batch or continuous basis.

After grinding has been completed, the finely divided gangue materials are removed from the slurry. Separation of the gangue materials from the larger olivine sand grains may be accomplished by known ore dressing techniques such as screening and hydraulic classification. Because the ground materials are in a water slurry, it is especially convenient to employ hydraulic classification to accomplish the separation and this technique is preferred.

The olivine sand product may, in many cases, be dried and used as a foundry sand without further processing. However, in order to meet specifications for a particular grade of foundry sand, it may be necessary to subject the olivine sand to a further sizing step. This may be accomplished by either wet or dry screening or by hydraulic classification.

In some instances, the crushed olivine rock contains a significant amount of very fine material. A preliminary hydraulic classification step may be used to remove the fines prior to attrition grinding. In other instances, particularly with olivine rock which contains a relatively large amount of gangue materials, it is advantageous to conduct the grinding in two stages. Crushed olivine rock is subjected to a first grinding stage after which the finely-divided particulate gangue material is removed. The olivine sand is then re-slurried and again treated by differential attrition grinding. Thereafter, finely-divided gangue material is again removed to yield an olivine sand product. It is also advantageous in certain circumstances to subject the olivine sand product to a final beneficiation step involving gravity separation. This may be accomplished by use of a shaking table or similar device. Alternatively, flotation techniques may be used to further beneficiate the olivine sand.

Olivine sand beneficiated by the process of this invention produces castings having superior surface quality. This improved result is attributed to two factors. First, the concentration of gangue minerals such as talc and serpentine is substantially reduced with a concomitant reduction in the LOI displayed by the sand product. Second, the rounded shape of the olivine grains tends to produce a higher quality mold. Even olivine foundry sand of acceptable commercial grade often shows sufficient improvement in casting quality to economically justify use of the disclosed process.

EXEMPLARY EMBODIMENTS OF THE INVENTION

The novel features and improved results obtained by practice of this invention are illustrated by the following examples:

EXAMPLE 1

A sample of North Carolina dunite was obtained which displayed a LOI of 3.5%. This sample was considered to be "non-commercial" in that it contained to much gangue to be economically beneficiated by gravity tabling. The sample was crushed and sized through a 20 mesh screen and was thereafter slurried in water.

A 20-inch diameter attrition grinder, such as that disclosed in the Feld et al patent, U.S. Pat. No. 3,075,710, was used to treat the dunite-water slurry by wet attrition differential grinding. The treated slurry was then beneficiated by means of a screw classifier and hydroseparator with the following results:

Table 1

| Product | Weight, percent | Analysis, percent/Distribution, percent | |
|---|---|---|---|
| | | LOI | LOI |
| screw classifier sands | 58.9 | 1. | 18.6 |
| hydroseparator underflow | 8.3 | 1.8 | 4.3 |
| composite sand product | 67.2 | 1.2 | 22.9 |
| hydroseparator overflow | 32.8 | 8.2 | 77.1 |
| composite total | 100.0 | 3.5 | 100.0 |

As may be seen from the Table, recovery of the composite sand product was 67.2% by weight of the dunite treated. the LOI of the sand product, 1.2%, is well below the maximum 1.35% LOI standard of SFSA.

EXAMPLE 2

A waste product from a commercial olivine beneficiation plant was treated by wet attrition differential grinding using the grinder described in Example 1. The waste material was sized through a 20-mesh screen and was mixed with water to form a slurry having about 40% solids. The slurry was ground for thirty minutes at a grinder rotor speed of 700rpm. Thereafter, the slurry was subjected to hydraulic classification with the following results:

Table 2

| Product | Weight, percent | Analysis, percent LOI | Distribution, percent LOI |
|---|---|---|---|
| classifier sands | 59.2 | 2.1 | 19.9 |
| classifier overflow | 40.8 | 12.3 | 80.1 |
| Composite | 100.0 | 6.2 | 100.0 |

While a substantial reduction in the LOI of the product fraction (classifier sands) was obtained, the product did not meet SFSA standards.

EXAMPLE 3

Another waste product fraction from a commercial olivine operation was sized to minus 20-mesh and mixed with water to form a slurry containing about 40% solids. This slurry was then treated by wet attrition grinding as in Example 2 for a 15-minute period. The ground slurry was then subjected to a first (primary) hydraulic classification and the primary classifier sand was re-slurried and again ground for 15 minutes at the same conditions as before. A second hydraulic classification was then performed. Results obtained by this procedure are tabulated as follows:

Table 3

| Product | Weight, percent | Analysis, percent LOI | Distribution, percent LOI |
|---|---|---|---|
| Secondary classifier sand | 62.4 | 1.4 | 15.1 |
| secondary classifier overflow | 6.5 | 2.3 | 2.6 |
| composite primary classifier sand | 68.9 | 1.5 | 17.7 |
| primary classifier overflow | 31.1 | 15.3 | 82.3 |
| Composite | 100.0 | 5.8 | 100.0 |

Again, the product fraction (secondary classifier sand) did not meet the SFSA standards for LOI.

EXAMPLE 4

Yet another waste product fraction from a commercial olivine operation was sized to pass a 20-mesh screen. This sized sample was then subjected to a primary hydraulic classification step at conditions such that substantially complete removal of the minus 200-mesh material was obtained.

The primary classifier sand was then mixed with water to form a slurry containing about 40% solids. The slurry was then subjected to wet attrition grinding for 15 minutes using the device of Example 2 at a rotor speed of 700rpm. A second hydraulic classification was then performed. Results obtained are set out in the following table:

Table 4

| Product | Weight, percent | Analysis, percent LOI | percent LOI |
|---|---|---|---|
| secondary classifier sand | 62.0 | 1.8 | 17.9 |
| secondary classifier overflow | 17.0 | 13.8 | 37.6 |
| composite primary classifier sand | 79.0 | 4.9 | 55.5 |
| primary classifier overflow | 21.0 | 13.2 | 44.5 |
| Composite | 100.0 | 6.2 | 100.0 |

As is shown by the data, the primary classification resulted in a significant reduction in LOI; from 6.2% to 4.9%. A further reduction in LOI to 1.8% was obtained by the attrition grinding and secondary classification steps. As in Examples 2 and 3, the product fraction (secondary classifier sand) did not meet the SFSA standard for LOI.

EXAMPLE 5

The product olivine sand fractions obtained in the experiments set out in Examples 2-5 were combined and were further beneficiated by tabling on a shaking table. There was obtained a final olivine sand product having a LOI of 0.9% and an overall recovery of about 55%.

This final sand product had a LOI well below that allowed by SFSA standards.

EXAMPLE 6

Samples of olivine foundry sand beneficiated as described in Examples 1-5 were visually compared to olivine foundry sand commercially beneficiated by gravity tabling. The wet attrition ground samples showed a marked rounding of the sand grains as contrasted to the sharp edged grains of the commercial olivine sand.

EXAMPLE 7

A number of ferrous metal castings were made using both commercial olivine foundry sand and an olivine foundry sand produced by wet attrition grinding in the manner set out in Examples 1-5. The surface quality of the castings were compared and it was found that the attrition ground olivine gave equal or superior results as compared to the commercial sand.

Similar nonferrous metal casting studies indicated that the attrition ground olivine sand gave significantly superior results based on the number of pit defects per square inch of the casting surface.

EXAMPLE 8

A sample of a commercial olivine foundry sand was obtained. A portion of this sample was subjected to a wet attrition grinding and a hydraulic classification in the manner set out in Examples 1-5. The original sample displayed a LOI of 1.6% while the beneficiated portion had a LOI of 1.0%.

Nonferrous metal castings were then made using both the commercial sand and the attrition ground sand. Pit defects on the surface of castings made using the commercial sand averaged about 12 per square inch while pit defects on the surface of casings made using the attrition ground sand averaged about 1 per square inch.

Other modifications and varients of the disclosed invention will be apparent to those having skill in the grinding and mineral dressing art.

I claim:

1. A process for the recovery of olivine sand from olivine-containing rock which comprises:

subjecting said rock to wet differential attrition grinding at an intensity and for a time sufficient to round individual olivine sand grains and to finely comminute the non-olivine gangue minerals contained in said rock;

separating said olivine sand grains from the finely comminuted non-olivine gangue minerals, and recovering an olivine sand product suitable for use as a foundry sand.

2. The process of claim 1 wherein said rock is crushed to about minus 20 mesh prior to attrition grinding.

3. The process of claim 2 wherein olivine sand grains are separated from gangue materials by hydraulic classification.

4. The process of claim 2 wherein olivine sand grains are separated from gangue materials by screening.

5. The process of claim 2 wherein said olivine-containing rock is dunite.

6. The process of claim 2 wherein said separated olivine sand grains are subjected to a second wet differential attrition grinding and are thereafter again separated from finely comminuted gangue minerals.

7. The process of claim 2 wherein said olivine sand product has a grain size larger than about 200 mesh and displays a LOI of less than 1.35%.

8. The process of claim 2 wherein the solids concentration is maintained within the range of 30% to 50% during said wet differential attrition grinding.

9. The process of claim 2 wherein the grinding time is in the range of 5 minutes to 1 hour.

10. An olivine foundry sand produced by the process of claim 1.

* * * * *